United States Patent
Portal

(10) Patent No.: US 6,454,333 B2
(45) Date of Patent: Sep. 24, 2002

(54) ROTATABLE GRIPPING DEVICE FOR TRANSPORT OR MACHINING OF AN ARBITRARILY SHAPED PART

(75) Inventor: Fabrice Portal, Chemin du bais (FR)

(73) Assignee: Eads Airbus SA, Paris Cedex (FR)

( * ) Notice: Subject to any disclaimer, the term of this patent is extended or adjusted under 35 U.S.C. 154(b) by 0 days.

(21) Appl. No.: 09/766,977

(22) Filed: Jan. 23, 2001

(30) Foreign Application Priority Data

Feb. 11, 2000 (FR) ............................................. 00 01725

(51) Int. Cl.7 ............................. B25J 15/06; F16D 3/02
(52) U.S. Cl. ......................... 294/64.1; 294/65; 403/76; 269/21
(58) Field of Search ................................ 294/64.1, 64.2, 294/64.3, 65; 403/76, 90, 122; 414/627, 737, 752.1; 901/40; 269/21

(56) References Cited

U.S. PATENT DOCUMENTS 4,269,383 A * 5/1981 Hackman et al. ........ 248/216.4
4,770,454 A * 9/1988 Muscher et al. ........... 294/64.1
4,806,070 A * 2/1989 Poux et al. ................. 198/409
5,029,383 A * 7/1991 Snyder et al. ................ 29/740
5,544,968 A * 8/1996 Goellner ................... 248/181.1

FOREIGN PATENT DOCUMENTS

| AT | 246957 | * 5/1966 | .................. 294/65 |
| EP | 490746 | 6/1992 | |
| FR | 2700487 | 7/1994 | |
| FR | 2711123 | 4/1995 | |

* cited by examiner

Primary Examiner—Dean J. Kramer
(74) Attorney, Agent, or Firm—Thelen Reid & Priest

(57) ABSTRACT

Rotatable gripping device for the transport or machining of an arbitrarily shaped part. A rotatable gripping device designed to be fitted on a universal table for the transport or machining of a part comprises a ball joint support (16), a ball joint (18) and a suction cup (44) supported by the ball joint. The vacuum in the suction cup (44) is created by the duct (50) connected through a flexible tube (54) directly to the ball joint (18)—suction cup (44) assembly, on the outside of the support (16). The resulting total angular movement of the suction cup (44) is thus at least 90° (+ or −45°).

8 Claims, 2 Drawing Sheets

ROTATABLE GRIPPING DEVICE FOR TRANSPORT OR MACHINING OF AN ARBITRARILY SHAPED PART

DESCRIPTION

1. Technical Field

The invention relates to a rotatable gripping device designed for machining or transport of a part with an arbitrary geometry.

In particular, this type of device can be used on a universal table for gripping one or several parts during machining or transport. In particular, it can be used for gripping parts with a wide variety of geometries with different complexities.

2. State of the Art

As illustrated particularly in document FR-A-2 700 487, it is known how to transport parts between different stations in an industrial installation making use of a transport pallet comprising a horizontal support plate equipped with an inner chamber forming a vacuum reservoir. Holes arranged in a regular network penetrate through the upper face of the support plate and open up into the inner chamber. Depending on the shape and dimensions of the parts to be transported, each hole contains either a gripping device with a suction cup, or a positioning device, or a closer. Each gripping device comprises a vertical column with a gripping suction cup fixed at its upper end. A three-way valve controls communication between each of the suction cups either with the atmosphere, or with the vacuum in the inner chamber of the support plate, through a duct formed in the column.

Since the gripping suction cups are installed fixed at the ends of the columns, this type of transport pallet can only contain plane parts. However, parts to be machined are not often plane. Furthermore, the geometric shapes of these parts are frequently different. Therefore, the use of a pallet of this type requires the use of a different gripping device for each part. This is unacceptable in an industrial process due to the cost and times that would be necessary.

Document FR-A-2 711 123 relates to a conveyor-manipulator used for large parts. The equipment comprises two platforms facing each other equipped with a large number of extendible columns fitted at their ends with gripping suction cups installed on ball joints. In this installation, each ball joint is kept in contact with an open ball joint support fixed to the end of the column through an elastic cord. The vacuum controlling gripping in each of these suction cups is applied to a central tube that passes through the corresponding column.

This arrangement can be used to grip parts without a complex geometry due to the movement of the suction cups that is possible due to the way in which they are installed on the ball joints. However, the maximum global movement of each of the suction cups is limited to about 60° (+ or −30°) which is not nearly enough to grip parts with complex geometries.

Based on a layout similar to that described in document FR-A-2 711 123, existing rotatable gripping devices cannot enable global movement of the gripping devices exceeding 80° (+ or −40°) since the vacuum is supplied through a duct that passes through the column and the support in which the ball joint is fitted.

DESCRIPTION OF THE INVENTION

The purpose of the invention is a rotatable gripping device with an innovative design of the suction cup gripping the part providing a global movement of at least 90° (+ or −45°), which enables the assembly of parts with complex geometries that can vary from one part to another with no particular adaptation.

According to the invention, this result is obtained by means of a rotatable gripping device comprising a ball joint, an open ball joint support in which the ball joint can pivot, a device forming a suction cup supported by the ball joint on the outside of the said ball joint support, means of holding the ball joint in the said ball joint support, and a first duct passing inside the means forming the suction cup and comprising at least one orifice formed either on the ball joint or the means forming the suction cup, the said orifice being connected to a flexible tube outside the ball joint support, and that can be connected to a vacuum source, characterized in that the means of holding the ball joint in the said ball joint support comprise a second duct passing through the ball joint support, at least one first orifice of this second duct leading into the space between the ball joint and the ball joint support.

If the vacuum supply to the suction cup passes through a flexible tube connected outside the ball joint instead of passing through a duct inside the column supporting it, the ball joint can rotate significantly further, usually at least 90°. The device according to the invention is thus adapted to gripping parts with complex geometries, different from one part to the next, with no particular adaptation.

Preferably, the flexible tube connects the orifice in the first duct to a second orifice in the second duct.

In this case, the second duct preferably comprises a third orifice that can be connected firstly to a compressed air source during a phase in which the ball joint is automatically oriented, and to the vacuum source mentioned above during a part gripping phase. With this arrangement, the part can be gripped in a preliminary phase during which the ball joint is automatically oriented with respect to the surface facing the part in order to optimize the orientation with respect to the said surface.

Advantageously, the center of gravity of the ball joint is offset in the opposite direction to the said means forming a suction cup, about a geometric center of the said ball joint. Due to this arrangement, the ball joint automatically returns to a neutral horizontal position when the installation is not in operation.

Preferably, the means forming a suction cup comprises a deformable suction cup and a thrust ring placed inside the suction cup. The presence of the thrust ring causes a better distribution of forces created by the vacuum, which prevents unwanted punching of the part to be machined.

In practice, the ball joint support comprises a spherical cap shaped cavity inside which the ball joint fits. The angle at the center of this cavity is not more than about 90°.

In order to give a good global distribution of the forces, the diameter of the deformable suction cup is advantageously approximately equal to the diameter of a circle delimiting the spherical cap shaped cavity.

As mentioned above, the ball joint is advantageously capable of pivoting at least 90° inside its support.

BRIEF DESCRIPTION OF THE DRAWINGS

We will now describe a preferred embodiment of the invention as a non-limitative example with reference to the attached drawings in which.

DETAILED DESCRIPTION OF A PREFERRED EMBODIMENT OF THE INVENTION

Figure 1:
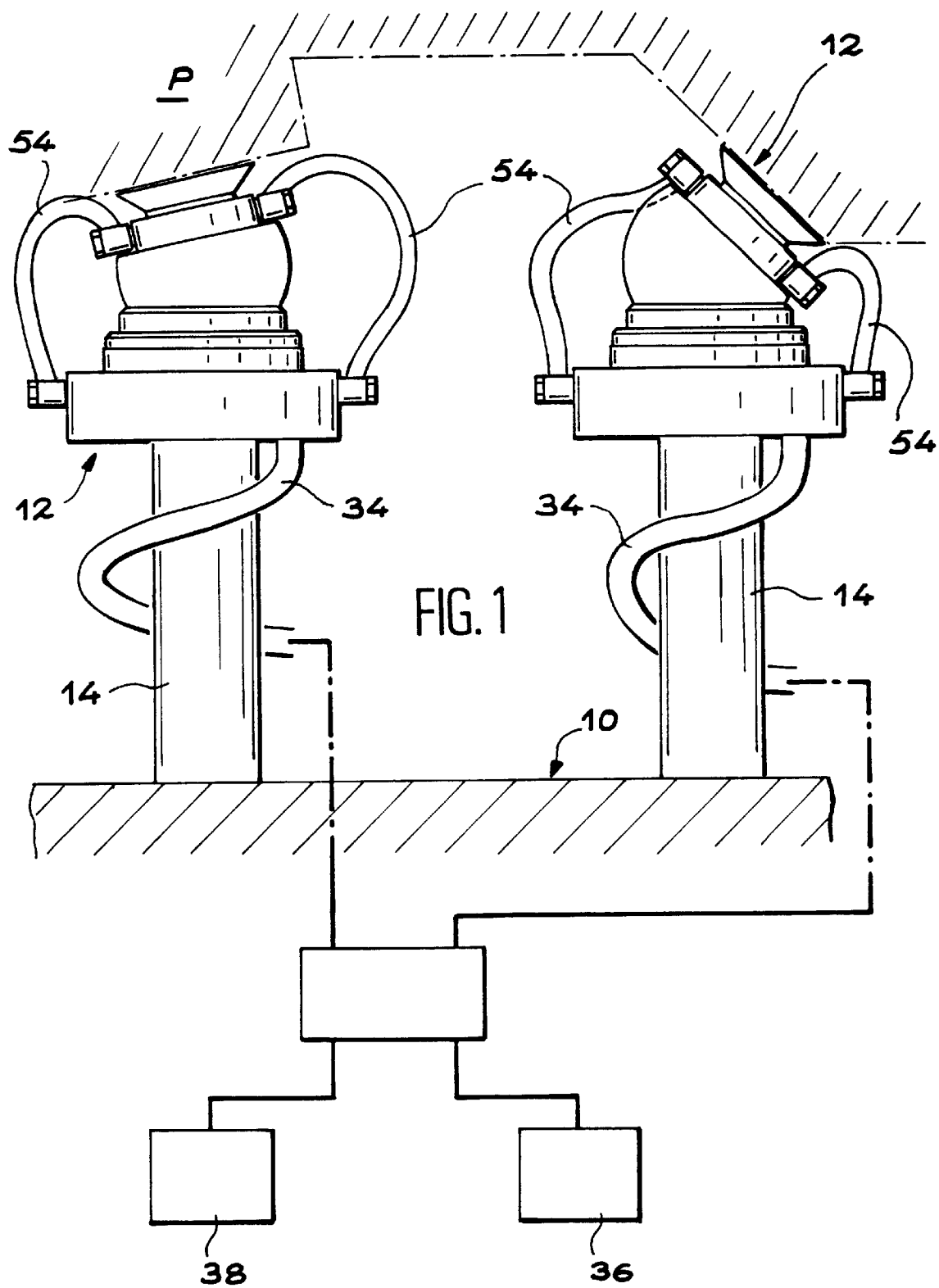
FIG. 1 is a side view showing a partial section diagrammatically showing a part of a universal table equipped with several rotatable gripping devices according to the invention.

FIG. 1 very diagrammatically shows part of a universal table 10 intended for the transport or machining of parts P.

The universal table 10 is fitted with a number of rotatable gripping devices 12 installed on columns 14 on its upper face, in order to enable this gripping. FIG. 1 only shows two rotatable gripping devices 12. In practice, the number of gripping devices 12 located on the universal table 10 depends largely on the size of this table and the number of parts that are to be transported.

Figure 2:
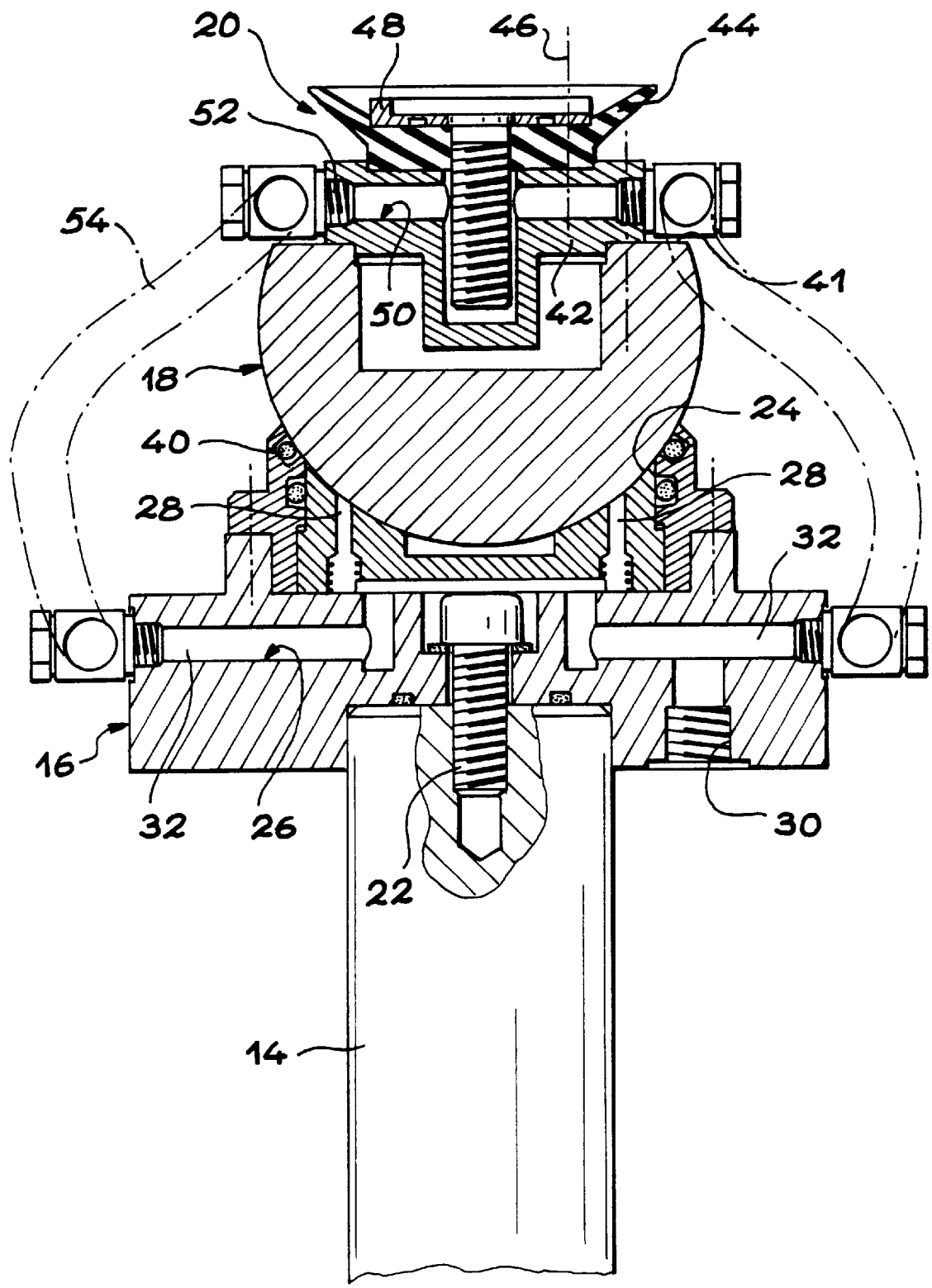
FIG. 2 is a sectional view illustrating one of the rotatable gripping devices in FIG. 1 at a larger scale.

According to the invention and as shown more precisely in FIG. 2, each rotatable gripping device 12 comprises an open ball joint support 16 faced at the end of column 14, and a ball joint 18 capable of pivoting in the ball joint support 16. Furthermore, each of the ball joints in the part outside the ball joint support 16 is fitted with a means forming a suction cup 20.

The open ball joint support 16 is in the form of a solid part made of several pieces. This part is fixed to the end of the column 14, for example by means of a screw 22. A cavity 24 in the form of a spherical cap is formed on the upper face of the open ball joint support 16, and the ball joint 18 is supported in this cavity by gravity.

A duct 26 passes through the solid part forming the ball joint support 16. This duct 26 opens up into the cavity 24 through one or several orifices 28. It also opens up onto the lower face of the ball joint support 16 through an orifice 30 and on the sides of this support 16 through at least one orifice 32 (two orifices in the example shown).

As diagrammatically illustrated in FIG. 1, a first end of a tube 34 is connected to the orifice 30. In the embodiment shown, the column 14 is extendible. The tube 34 is then a flexible tube, for example wound spirally around column 14. The opposite end of the tube 34 may be connected as required either to a compressed air source 36 or to a vacuum source 38, as shown diagrammatically in FIG. 1.

The periphery of cavity 24 in the shape of a spherical cap has a circular groove in which an O-ring 40 is housed. This O-ring 40 is in leak tight contact with the outside surface of the ball joint 18. It thus normally isolates the space between the cavity 24 and the ball joint 18 into which the orifices 28 from duct 26 lead, from the outside atmosphere.

The ball joint 18 is in the form of a solid spherical part on which a flat 41 is machined in order to fix the means forming a suction cup 20. More precisely, the means forming a suction cup 20 comprises a base 42 fixed on the flat 41, for example using a screw (not shown). A deformable suction cup 44 is fixed on the base 42, for example by means of screws 46. Furthermore, a rigid thrust ring 48 is fixed coaxially inside the suction cup 44 and is fixed to the suction cup, and to the base 42, by screws 46.

A duct 50 penetrates through the base 42, the suction cup 44 and the thrust ring 48, and one end of this duct opens up inside the suction cup 44 and the thrust ring 48. The passage 50 also comprises at least one orifice 52 (two in example shown) that opens up on the outside, on the base 42, outside the cavity 24 formed in the ball joint support 16.

Each orifice 32 of duct 26 is connected to one of the orifices 52 of duct 50 through a flexible tube 54 as shown diagrammatically in FIG. 1.

The layout described above enables an angular movement of the ball joint 18 relative to the ball joint support 16 equal to at least about 90° (+ or −45°). This characteristic is mainly due to the fact that the vacuum created on the suction cup 44 is only applied from the outside of the ball joint support 16 through the flexible tube 54. It is also due to the fact that the spherical cap formed by the cavity 24 has an angle at the center equal to not more than about 90°. The particularly large movement of the suction cup 44 means that parts with particularly complex shapes can be supported, which was not possible in the past.

Furthermore, as shown in FIG. 2, the diameter of the deformable suction cup 44 is approximately equal to the diameter of the circle delimiting the cavity 24 in the shape of a spherical cap. This arrangement gives a good global distribution of the forces.

In the embodiment shown, the solid part forming the ball joint 18 is partially hollowed out at the center of the flat 41 on which the means forming a suction cup 20 is supported. The center of gravity of the ball joint 18 is thus offset in the direction opposite the means forming a suction cup 20 about the geometric center of the ball joint. This characteristic enables the suction cup 44 to automatically return to the horizontal neutral position when the gripping device is at rest.

When this type of rotatable gripping device is used, the column 14 is firstly set to the right height relative to the part to be machined. This operation may be done manually or automatically, for example using a numerical control. High pressure air is then injected through the tube 34 and the orifice 30 of duct 26, which has the effect of creating an air cushion between the ball joint 18 and the support 16, and between the part P and the suction cup 44. Automatic positioning is thus achieved in a particularly efficient and reliable manner.

Note that in one advantageous embodiment of the invention, the control circuit for the means used as a suction cup 20 may be dissociated from the control circuit opening up between the ball joint 18 and the cavity 24. For example, this means that the ball joint 18 can be blocked by the vacuum in a well defined position, while independently controlling the vacuum or lifting force applied to the part by the suction cup. In this case, the orientation of the ball joint 18 may be adjusted either manually, or using a numerical control.

What is claimed is:

1. Rotatable gripping device comprising a ball joint, an open ball joint support in which the ball joint can pivot, a means forming a suction cup supported by the ball joint on the outside of the ball joint support, means of holding the ball joint in the ball joint support, and a first duct passing inside the means forming the suction cup and comprising at least one orifice formed either on the ball joint or the means forming the suction cup, the orifice being connected to a flexible tube outside the ball joint support, and that can be connected to a vacuum source, characterized in that the means of holding the ball joint and the ball joint support comprise a second duct passing through the ball joint support, at least one first orifice of this second duct leading into a space between the ball joint and the ball joint support.

2. Rotatable gripping device according to claim 1, in which the center of gravity of the ball joint is offset in the opposite direction to the means forming a suction cup, about a geometric center of the ball joint.

3. Rotatable gripping device according to claim 1, in which the ball joint is capable of pivoting at least 90° inside the ball joint support.

4. Rotatable gripping device comprising a ball joint, an open ball joint support in which the ball joint can pivot, a means forming a suction cup supported by the ball joint on the outside of the ball joint support, means of holding the ball joint in the ball joint support, and a first duct passing inside the means forming the suction cup and comprising at least one orifice formed either on the ball joint or the means forming the suction cup, the orifice being connected to a flexible tube outside the ball joint support, and that can be connected to a vacuum source, characterized in that the means of holding the ball joint and the ball joint support comprise a second duct passing through the ball joint support, at least one first orifice of this second duct leading into a space between the ball joint and the ball joint support, in which the flexible tube connects the orifice in the first duct to a second orifice in the second duct.

5. Rotatable gripping device according to claim 4, in which the second duct comprises a third orifice that can be connected firstly to a compressed air source during a phase in which the ball joint is automatically oriented, and to the vacuum source mentioned above during a part gripping phase.

6. Rotatable gripping device comprising a ball joint, an open ball joint support in which the ball joint can pivot, a means forming a suction cup supported by the ball joint on the outside of the ball joint support, means of holding the ball joint in the ball joint support, and a first duct passing inside the means forming the suction cup and comprising at least one orifice formed either on the ball joint or the means forming the suction cup, the orifice being connected to a flexible tube outside the ball joint support, and that can be connected to a vacuum source, characterized in that the means of holding the ball joint and the ball joint support comprise a second duct passing through the ball joint support, at least one first orifice of this second duct leading into a space between the ball joint and the ball joint support, in which the means forming a suction cup comprises a deformable suction cup and a thrust ring placed inside the suction cup.

7. Rotatable gripping device according to claim 6, in which the ball joint support comprises a spherical cap shaped cavity into which the ball joint is received, the spherical cap shaped cavity disposed not more than about 90° around the ball joint.

8. Rotatable gripping device according to claim 7, in which the diameter of the deformable suction cup is approximately equal to the diameter of a circle delimiting the spherical cap shaped cavity.

* * * * *